(12) United States Patent
Giallorenzo et al.

(10) Patent No.: US 6,257,070 B1
(45) Date of Patent: Jul. 10, 2001

(54) METHOD AND APPARATUS FOR DETERMINING REAL TIME LIQUID AND GAS PHASE FLOW RATES

(75) Inventors: Mario Giallorenzo, Edo Miranda; Jose Colmenares, Los Teques; Francisco Pernia, Edo Miranda; Francisco Gomez, Caracas; Oswaldo Rivas, Los Teques, all of (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 09/229,930

(22) Filed: Jan. 13, 1999

(51) Int. Cl.$^7$ ....................................................... G01F 1/74
(52) U.S. Cl. ................................................. 73/861.04
(58) Field of Search .............................. 73/861.04, 198, 73/200

(56) References Cited

U.S. PATENT DOCUMENTS

| | | | |
|---|---|---|---|
| 3,135,113 | * 6/1964 | Walker et al. | 73/200 |
| 4,549,432 | 10/1985 | Bland et al. | 73/200 |
| 4,596,136 | * 6/1986 | Zacharias | 73/861.04 |
| 4,688,418 | * 8/1987 | Cheung et al. | 73/200 |
| 4,773,257 | * 9/1988 | Aslesen et al. | 73/861.04 |
| 5,396,807 | 3/1995 | Dowty et al. | 73/861.04 |
| 5,526,684 | * 6/1996 | Liu et al. | 73/861.04 |
| 5,841,020 | 11/1998 | Guelich | 73/200 |

\* cited by examiner

*Primary Examiner*—Harshad Patel
(74) *Attorney, Agent, or Firm*—Bachman & LaPointe, P.C.

(57) ABSTRACT

A method for determining real time liquid phase flow rate from a biphase stream includes the steps of: providing a stream of a biphase fluid including a gas phase having a known gas density and a liquid phase having a known liquid density; providing a separator having a known volume gradient corresponding to liquid level in the separator; feeding the stream to the separator so as to provide a separated liquid phase containing a portion or the gas phase as entrapped gas and a separated free gas phase in the separator; measuring density of the separated liquid phase; measuring change in level over time of the separated liquid phase in the separator; and determining a liquid phase flow rate from the change in level over time, the separated liquid phase density, the known gas density and the known liquid density.

12 Claims, 3 Drawing Sheets

METHOD AND APPARATUS FOR DETERMINING REAL TIME LIQUID AND GAS PHASE FLOW RATES

BACKGROUND OF THE INVENTION

The invention relates to a method and apparatus for obtaining real time measurements, with a high degree of accuracy, of the net liquid and net gas production rates of a hydrocarbon producing well.

Hydrocarbon producing wells typically produce a biphase stream of liquid and gas phase components. These phases are typically separated, for example in gas-liquid separators, so that each phase can be processed and used as desirable.

It is desirable to obtain accurate and up-to-date measurements of flow rates of the various products of hydrocarbon producing wells. Specifically, it is desirable to provide accurate and instantaneous or real-time measurements of the liquid and gas phase components of the produced biphase stream.

It is therefore the primary object of the present invention to provide a method and apparatus for determining real time liquid phase flow rate from a biphase stream.

It is a further object of the present invention to provide such a method and apparatus wherein accuracy of the measurements is within about 2% of actual production rates.

It is a still further object of the present invention to provide such a method and apparatus wherein the liquid phase determination is corrected for entrapped gas, and an accurate total gas flow rate determination is also provided.

Other objects and advantages of the present invention will appear hereinbelow.

SUMMARY OF THE INVENTION

In accordance with the present invention, the foregoing objects and advantages have been readily attained.

According to the invention, a method is provided for determining real time liquid phase flow rate from a biphase stream, which method comprises the steps of: providing a stream of a biphase fluid including a gas phase having a known gas density and a liquid phase having a known liquid density; providing a separator having a known volume gradient corresponding to liquid level in said separator; feeding said stream to said separator so as to provide a separated liquid phase containing a portion of said gas phase as entrapped gas and a separated free gas phase in said separator; measuring density of said separated liquid phase; measuring change in level over time of said separated liquid phase in said separator; and determining a liquid phase flow rate from said change in level over time, said separated liquid phase density, said known gas density and said known liquid density.

In further accordance with the present invention, a system has been provided for determining real time liquid phase flow rate from a biphase stream including a liquid phase having a known liquid density and a gas phase having a known gas density, which system comprises: a separator having a known volume gradient corresponding to liquid level in said separator; means associated with said separator for determining a measured density of separated liquid phase in said separator; means associated with said separator for determining liquid level in said separator and for determining a change in liquid level over time; and processing means associated with said separator for determining a liquid phase flow rate from said change in liquid level over time, said measured density, said known liquid density and said known gas density.

BRIEF DESCRIPTION OF THE DRAWINGS

A detailed description of preferred embodiments of the present invention follows, with reference to the attached drawings, wherein.

DETAILED DESCRIPTION

In accordance with the present invention, a system and method are provided for determining real time liquid and gas phase flow rates from a biphase stream.

In accordance with the present invention, real time measurements of liquid level and density are obtained from a liquid-gas separator, and are correlated with a known volume gradient of the separator so as to provide instantaneous or real time measurements of flow rates of the liquid phase and gas phase components of a biphase stream.

Typically, the biphase stream will comprise a liquid phase such as a heavy hydrocarbon liquid phase, for example having an API gravity less than about 18 and a viscosity at 60° F. of greater than about 300 cp, and an entrapped gas phase as produced from a hydrocarbon producing well. For example, the method and system of the present invention would be useful in connection with a fluid stream produced from a hydrocarbon producing well which could typically include a heavy crude oil liquid hydrocarbon portion having an API gravity of 13 in which, at standard temperature and pressure (60° F., 1 atm), entrapped hydrocarbon gas could account for approximately 40% of the total volume. When this biphase stream is introduced to a separator, entrapped gas escapes from the liquid phase and into the upper area of the separator, while the liquid phase collects in the lower area of the separator. The method and apparatus of the present invention provide for obtaining accurate measurements of the liquid and gas flow rates in a real time or instantaneous manner.

Figure 1:
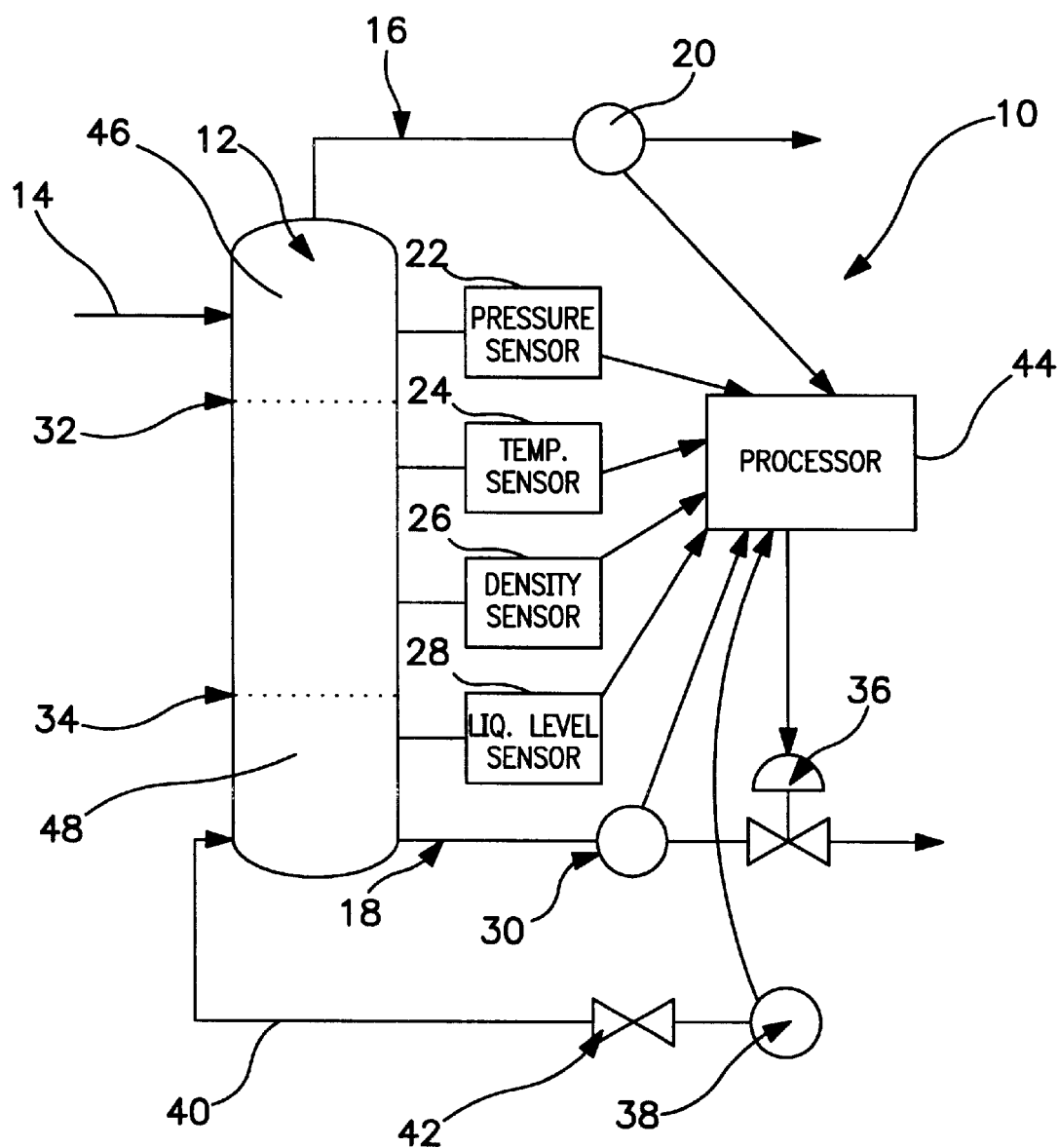
FIG. 1 is a schematic view of an apparatus in accordance with the present invention.

FIG. 1 schematically shows system 10 in accordance with the present invention. System 10 typically includes a separator 12 having an inlet 14 for delivering the biphase stream to be separated, a gas outlet 16 for free gas exiting separator 12, and a liquid outlet 18 for separated liquid exiting separator 12. A gas flow meter 20 may suitably be arranged along gas outlet 16, for use in measuring flow of free gas exiting separator 12. In addition, separator 12 is preferably associated with a pressure sensor 22, temperature sensor 24, apparatus 26 for measuring density of liquid within separator 12 and an apparatus 28 for measuring the level of separated liquid phase within separator 12. System 10 preferably also includes an apparatus 30 for measuring water content of separated liquid exiting separator 12 through outlet 18.

In accordance with the present invention, volumes of liquid within separator 12 are determined from the level of liquid contained therein. In accordance with the present invention, and in order to insure good accuracy of measurements, separator 12 is preferably calibrated so as to readily obtain accurate volume measurements corresponding to the level of liquid contained therein, so as to provide a reliable volume gradient corresponding to liquid level in the separator. Preferably, this calibration is carried out at least between a known upper level 32 and lower level 34 within separator 12 as will be more thoroughly discussed below. System 10 preferably also includes a dump control valve 36 for controlling flow of liquid through outlet 18, and may further preferably include a flow meter 38 arranged along a calibration inlet 40 having a calibration auxiliary valve 42 which, also as will be discussed below, can readily be used in order to calibrate the volumetric space within separator 12 corresponding to particular sensed liquid levels contained therein.

Finally, system 10 in accordance with the present invention also includes a processor 44 associated with the various components of system 10 as set forth above so as to obtain relevant information from various devices of system 10, and store relevant information useful for future calibrations and/or calculations. Processor 44 is programmed or adapted to utilize pertinent information obtained as specified so as to provide accurate real time measurements of liquid and gas flow rates as desired.

Separator 12 may be any suitable separator vessel as is readily known to a person of ordinary skill in the art. As set forth above, calibration of a volume gradient of separator 12 corresponding to liquid level therein is advantageous in accordance with the present invention so as to provide accurate volumetric measurements corresponding to such level which are not rendered inaccurate due to irregular geometries or additional volumes which are connected to the inner space of separator 12. For example, flow lines to various gauges and meters cannot easily be incorporated into calculations based upon the geometry of separator 12.

Figure 2:
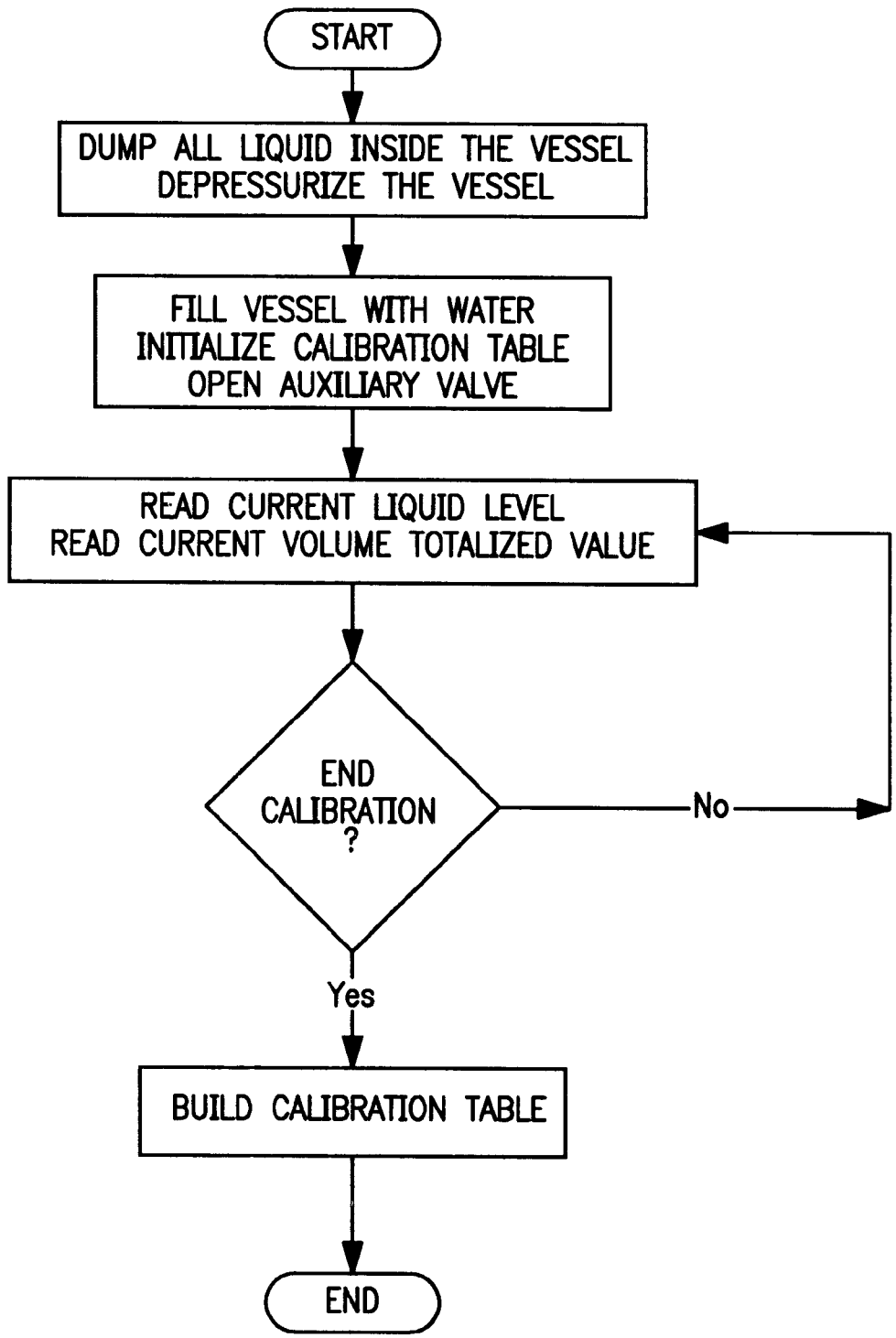
FIG. 2 schematically illustrates calibration of a separator vessel.

Referring now to FIG. 2, a typical method in accordance with the present invention for calibrating separator 12 is illustrated. In order to begin calibration of separator 12, separator 12 is initially completely emptied and depressurized. Separator 12 is then filled with water, and processor 40 stores relevant volume information corresponding to water level within separator 12 so as to initialize a volume calibration table containing the desired volume gradient. Volume corresponding to liquid level is measured by flow meter 38 and conveyed to processor 44 as shown in FIG. 1. This process may be repeated once or more times until the volume within separator 12 is sufficiently calibrated, at which time system 10 is fully ready for use in accordance with the present invention.

Figure 3:
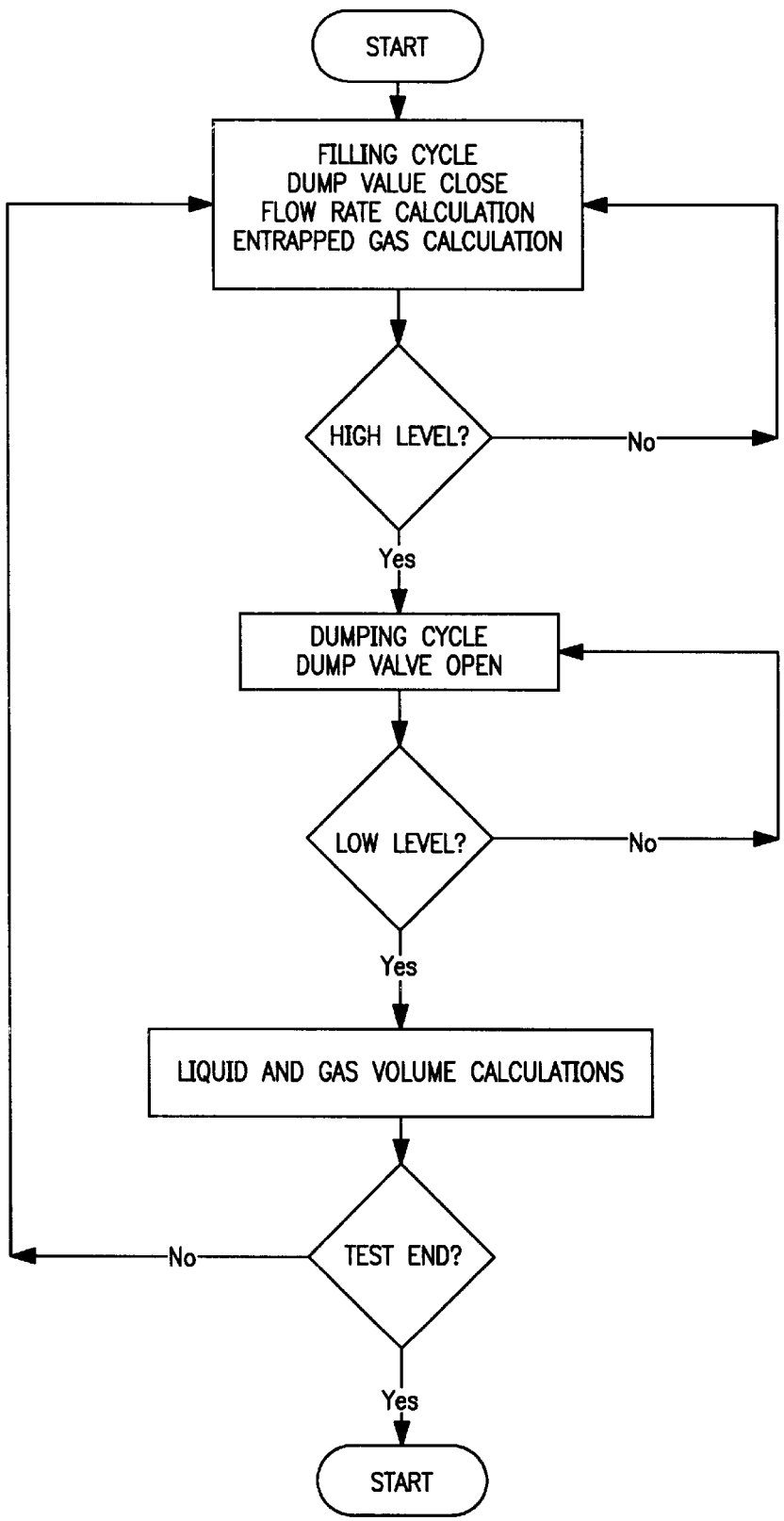
FIG. 3 schematically illustrates operation of the system and method of the invention.

Referring now to FIG. 3, a method of operation of system 10 in accordance with the present invention is illustrated. At the beginning of the operation, processor 44 is already provided with certain known information about the fluids being produced from the particular hydrocarbon well or other source of biphase stream to be measured. This known information includes gas phase density and liquid phase density. Dump valve 36 is closed and biphase stream is introduced into separator 12 through inlet 14. This begins a filling cycle during which separator 12 will be allowed to fill with biphase stream so as to provide separated free gas in an upper portion 46 of separator 12, and further so as to provide separated liquid phase in a lower portion 48 of separator 12. Separated free gas flow rate is measured and stored by processor 44. The separated liquid phase portion at this point will still include some entrapped gas. As separator 12 is filling toward known high level 32, density of the separated liquid phase in separator 12 is measured using apparatus 26 for measuring density, and this information is conveyed to processor 44. This continues until the level of separated liquid phase within separator 12 reaches high level 32, at which point processor 44 opens dump valve 36, and a dumping cycle begins and continues until the level of separated liquid within separator 12 reaches low level 34. At this point in time, processor 44, which has also monitored and stored the elapsed time of filling and dumping cycles, can readily determine the desired liquid and gas phase flow rates from the measured separated liquid phase density, known gas phase density, known liquid phase density, measured free gas flow rate through outlet 16, and elapsed time between high level 32 and low level 34. This information is provided in a real time and accurate manner.

It is well known that the liquid hydrocarbon phase separated from a biphase hydrocarbon stream produced from a hydrocarbon producing well will typically include water as well as liquid hydrocarbon. If this is the case, apparatus 30 for measuring water content of liquid phase exiting separator 12 through outlet 18 is provided so as to measure the water content of liquid phase and provide this information to processor 44 so as to more accurately predict the known liquid phase volume, and so as to further allow for determination or measurement of actual liquid hydrocarbon flow rate and water flow rate.

The method of the present invention provides for extremely accurate measurements. This is due, in part, to the fact that the densities of gas and liquid are in sharp contrast to one another. Specifically, gas density is approximately 1000 times smaller than the typical liquid density in question. Thus, gas density can be treated as approaching zero. This provides for an uncertainty or error of 0.1%. Typically, a densitometer or other conventionally used apparatus for measuring density which would be useful as apparatus 26 also has an uncertainty or error of about 0.1%. Thus, the system and method of the present invention provide measurements which are accurate within about 2% (vol.), preferably within about 0.2% (vol.) of actual values.

In accordance with the invention, separation is carried out using any conventional separator which typically has a wall structure defining an internal space or chamber which is typically substantially cylindrical in shape. According to the invention, an accurate calibration of liquid volume corresponding to various liquid levels in the separator is obtained and used as will be thoroughly described below to obtain accurate measurements. The separator typically includes additional flow areas such as tubes, gauges and the like which result in irregular geometries and must be taken into account in order to provide an accurate measurement of fluid volume in the separator. In accordance with the present invention, the calibration is prepared taking these additional areas into account so that volume can be determined from liquid level without this source of error. A processor for carrying out the method of the present invention is provided with the calibration information so as to accurately determine real time liquid volume in the separator corresponding to a particular liquid level therein.

In accordance with the present invention, as the biphase stream is fed to the separator, the liquid outlet of the separator is controlled so as to cyclically operate the separator between filling and dumping the separated liquid phase between an upper known level and a lower known level in the separator. By measuring the liquid density using conventional techniques, and by measuring elapsed time of the filling and dumping cycles, a processor having been programmed with known liquid phase density and gas phase density can then determine the liquid phase flow rate and gas phase flow rate resulting from separation of the biphase stream.

In operation, the method of the present invention is carried out as follows.

A biphase stream of hydrocarbon liquid and gas is fed to a separator which is associated with a processor for making the desired measurements and determinations. The processor includes stored calibration information correlating a volume gradient corresponding to liquid level in the separator so that accurate liquid volume information is readily available from a measured liquid level. The biphase stream in the separator separates into a gas phase filling the upper area of the separator and a liquid phase occupying the lower area of the separator. The liquid phase in the lower area of the separator will typically still comprise a biphase fluid including the liquid hydrocarbon and a portion of gas which remains entrapped therein.

According to the invention, measurement of the exiting separated liquid phase density in combination with known liquid and gas phase densities allows for determination of the amount of gas remaining entrained therein, thereby allowing for more accurate determination of the actual liquid (specifically hydrocarbon and water) and gas phases.

In accordance with the present invention, density of the liquid phase exiting the separator is measured, and time measurements taken between operation in a filling and dumping mode of the separator, so as to accurately determine the net liquid phase volume and net gas phase volume for such time periods, thereby providing the desired real time liquid and gas phase flow rates. The method and apparatus of the invention advantageously provide for determination of real time measurements with an accuracy within about 2%, and preferably within about 0.2%, of actual flow.

In some instances, the biphase stream may include water as well. The method and apparatus of the invention allow the accurate determination of the water flow rate, separately from the liquid hydrocarbon flow rate. In this regard, an apparatus for measuring the water cut or content of the liquid stream, such as apparatus 30, can readily identify the water and hydrocarbon content of the separated liquid phase. This information, along with the known hydrocarbon and water densities, allows for more accurate determination of the known liquid phase density as mentioned above, and also allows for actual determination of specific water flow rate and liquid hydrocarbon flow rate as desired in accordance with the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for determining real time liquid phase flow rate from a biphase stream, comprising the steps of:
    providing a stream of a biphase fluid including a gas phase having a known gas density and a liquid phase having a known liquid density;
    providing a separator having a known volume gradient corresponding to liquid level in said separator;
    feeding said stream to said separator so as to provide a separated liquid phase containing a portion of said gas phase as entrapped gas and a separated free gas phase in said separator;
    measuring density of said separated liquid phase;
    measuring change in level over time of said separated liquid phase in said separator; and
    determining a liquid phase flow rate from said change in level over time, said separated liquid phase density, said known gas density and said known liquid density.

2. A method according to claim 1, wherein said separator has an irregular geometry, and said known volume gradient includes corrections for said irregular geometry.

3. A method according to claim 1, wherein said step of measuring change in level comprises cyclically filling and dumping said separator so as to maintain said liquid level between a known upper level and a known lower level, and measuring a time interval between said filling and said dumping.

4. A method according to claim 3, wherein said liquid phase flow rate is determined after each dumping of said separator.

5. A method according to claim 1, wherein said separator is a substantially uniform cylinder defining a separation chamber for said fluid, wherein additional flow areas extend from said chamber, and wherein said volume gradient includes corresponding volume from said chamber and from said additional flow areas.

6. A method according to claim 1, further comprising the steps of measuring a free gas flow rate from a gas outlet of said separator and determining an entrapped gas phase flow rate from a liquid outlet of said separator from said change in level over time, said known gas density and said separated liquid phase density so as to provide a total gas flow rate measurement incorporating said free gas flow rate and said entrapped gas phase flow rate.

7. A method according to claim 1, wherein said liquid phase flow rate is accurate within about 2% (vol.) of actual values.

8. A method according to claim 1, wherein said stream of biphase fluid comprises a heavy hydrocarbon liquid phase and a hydrocarbon gas phase entrapped in said liquid phase.

9. A method according to claim 8, wherein said stream is obtained from a hydrocarbon producing well.

10. A method according to claim 8, wherein said heavy hydrocarbon liquid phase has a viscosity at 60° F. of greater than about 300 cp and an API gravity of less than about 18.

11. A system for determining real time liquid phase flow rate from a biphase stream including a liquid phase having a known liquid density and a gas phase having a known gas density, comprising:
    a separator having known volume gradient corresponding to liquid level in said separator;
    means for measuring a density of separated liquid phase in said separator so as to provide a measured density;
    means for determining liquid level in said separator and for determining a change in liquid level over time; and
    processing means for determining liquid phase flow rate from said change in liquid level over time, said measured density, said known liquid density and said known gas density.

12. A system according to claim 11, wherein said separator has a gas outlet for exiting free gas and a liquid outlet for exiting separated liquid including entrapped gas, and wherein said system further comprises means for determining free gas flow from said gas outlet, and wherein said processing means determines entrapped gas flow rate from said liquid outlet so as to provide a total gas phase flow rate.

* * * * *